United States Patent [19]
Geiser et al.

[11] Patent Number: 5,146,819
[45] Date of Patent: Sep. 15, 1992

[54] GUIDE-BAR DEVICE FOR AUTOMATIC LATHE AND METHOD OF FABRICATION THEREOF

[75] Inventors: Markus Geiser, Péry; Claude Vandevoir, La Neuveville, both of Switzerland

[73] Assignee: Sameca SA, Lamboing, Switzerland

[21] Appl. No.: 727,584

[22] Filed: Jul. 9, 1991

Related U.S. Application Data

[63] Continuation of Ser. No. 210,029, Jun. 22, 1988, Pat. No. 5,048,383.

Foreign Application Priority Data

Jun. 24, 1987 [EP] European Pat. Off. ........ 87810361.3

[51] Int. Cl.$^5$ ............................................. B23B 13/08
[52] U.S. Cl. ........................................ 82/127; 82/126; 414/745.1
[58] Field of Search ................. 82/125, 126, 127, 162, 82/163; 414/17, 745.1, 745.2

[56] References Cited

U.S. PATENT DOCUMENTS

| | | | |
|---|---|---|---|
| 3,693,810 | 9/1972 | Gumhold | 82/126 |
| 3,874,519 | 4/1975 | Mikami | 82/126 |
| 4,577,536 | 3/1986 | Lechot | 414/17 |
| 4,889,024 | 12/1989 | Geiser et al. | 82/127 |

FOREIGN PATENT DOCUMENTS

| | | |
|---|---|---|
| 0070073 | 10/1983 | European Pat. Off. . |
| 0160498 | 11/1985 | European Pat. Off. . |
| 0214926 | 3/1987 | European Pat. Off. . |
| 773584 | 5/1934 | Fed. Rep. of Germany . |
| 1775871 | 6/1958 | Netherlands . |
| 1602846 | 8/1971 | Netherlands . |
| 2000702 | 1/1979 | United Kingdom . |

*Primary Examiner*—Z. R. Bilinsky
*Attorney, Agent, or Firm*—Marks & Murase

[57] ABSTRACT

The device comprises essentially a body or shaped piece of cylindrical form and of a circular or polygonal cross section, comprising tubular cavities of different diameters for receiving the bars to be machined of different diameters. The tubular cavities can comprise longitudinal distribution channels for feeding oil under pressure to the bar to be machined. The cylindrical body further comprises indexing grooves at its external periphery, means of distribution of oil at the rear part of the device, an oil collector located at the front part of the device and cavities permitting the return of the oil to a hydraulic group. Reinforcing ribs are provided between the tubular cavities and between the latter and a mantle of the cylindrical body so that the latter has a great moment of inertia which ensures a good stability of the device. The tubular cavities may comprise tubes aligned along the longitudinal axis of the cavities and rotating freely with play in these tubular cavities. These tubes are the proper guiding tubes and they protect the tubular cavities against the damages which could be caused by the fast rotating bars to be machined. These tubes permit also to create a double hydrodynamic bearing permitting to impart very great speeds of rotation to the bars to be machined.

10 Claims, 7 Drawing Sheets

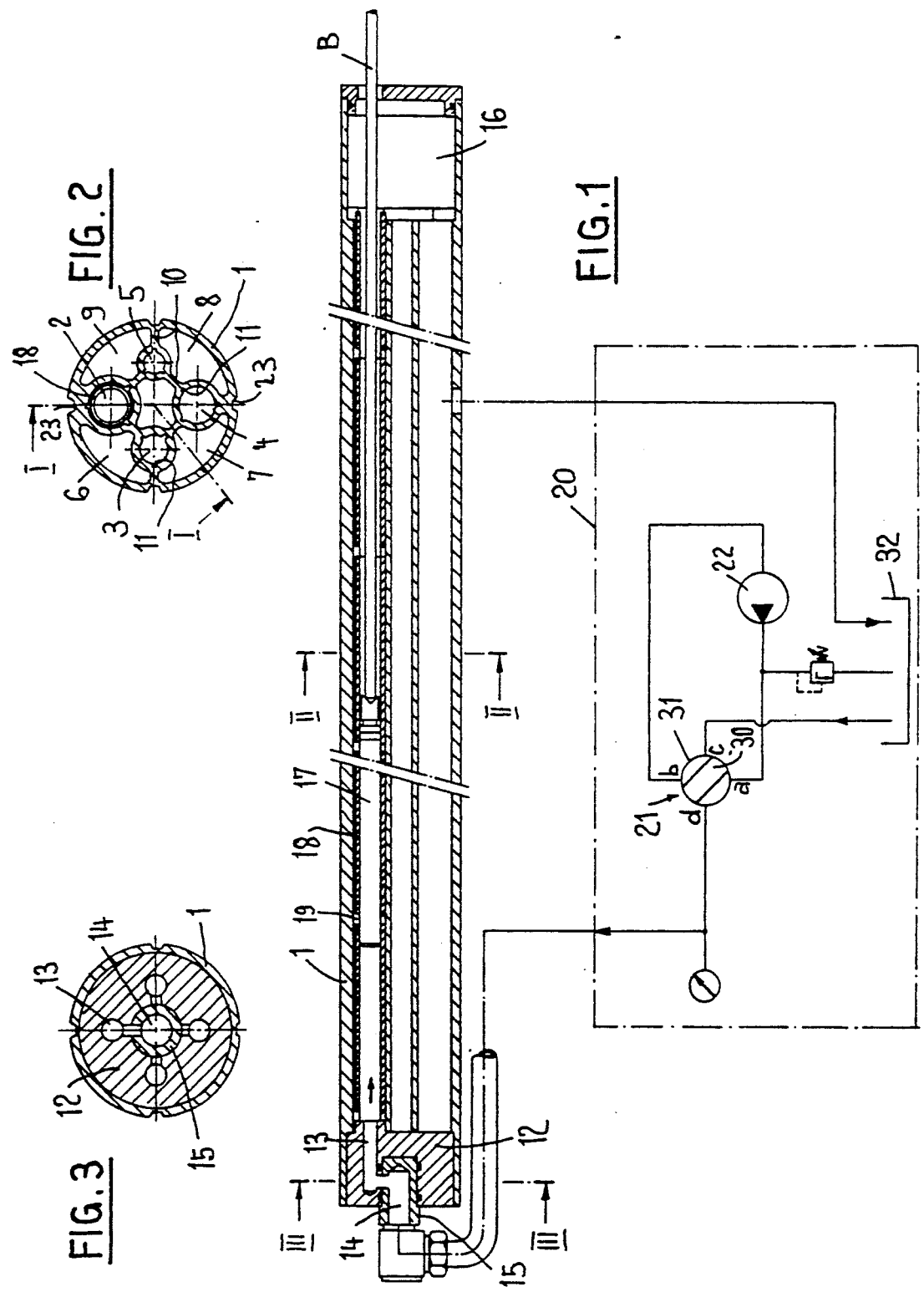

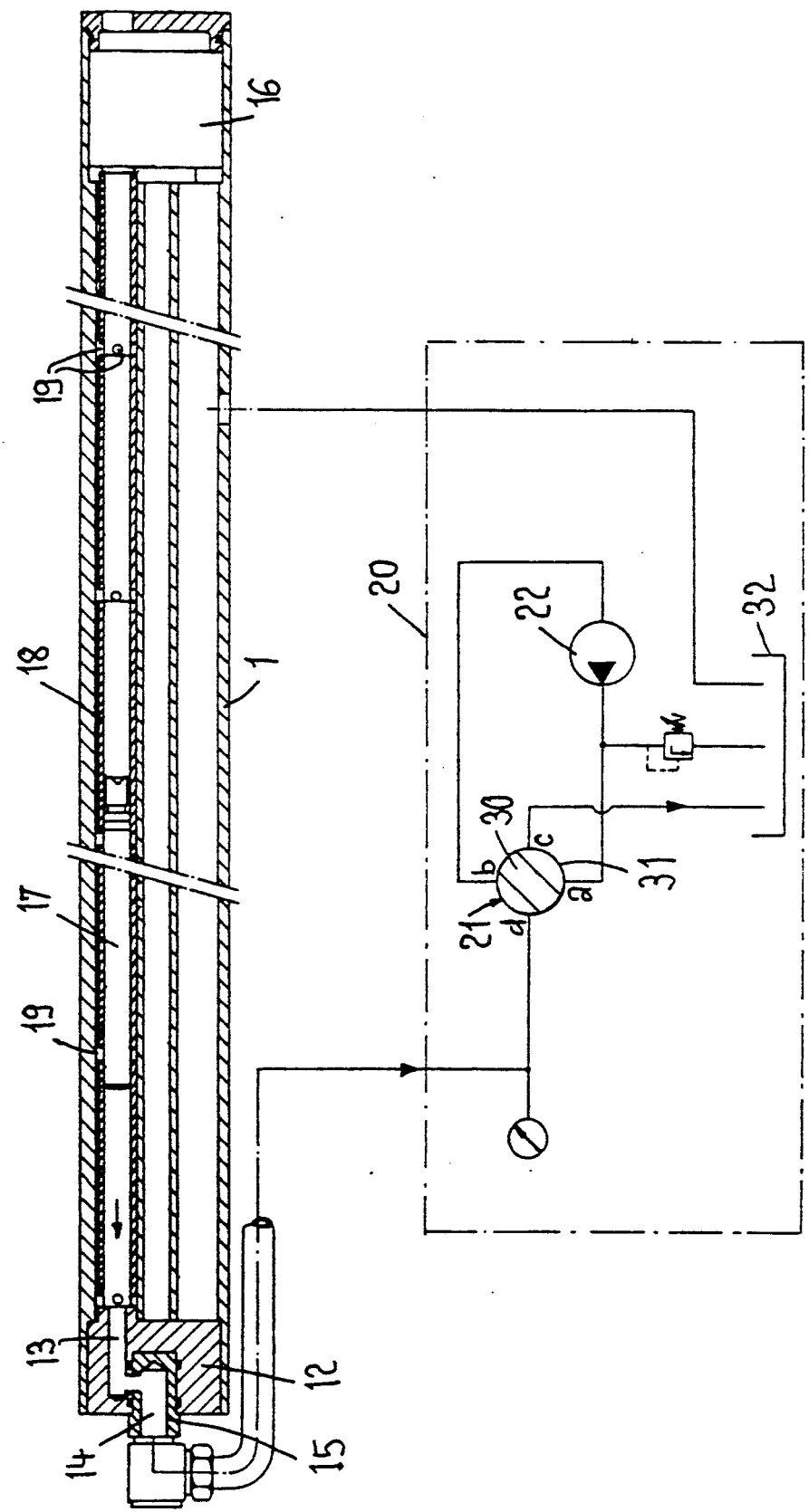

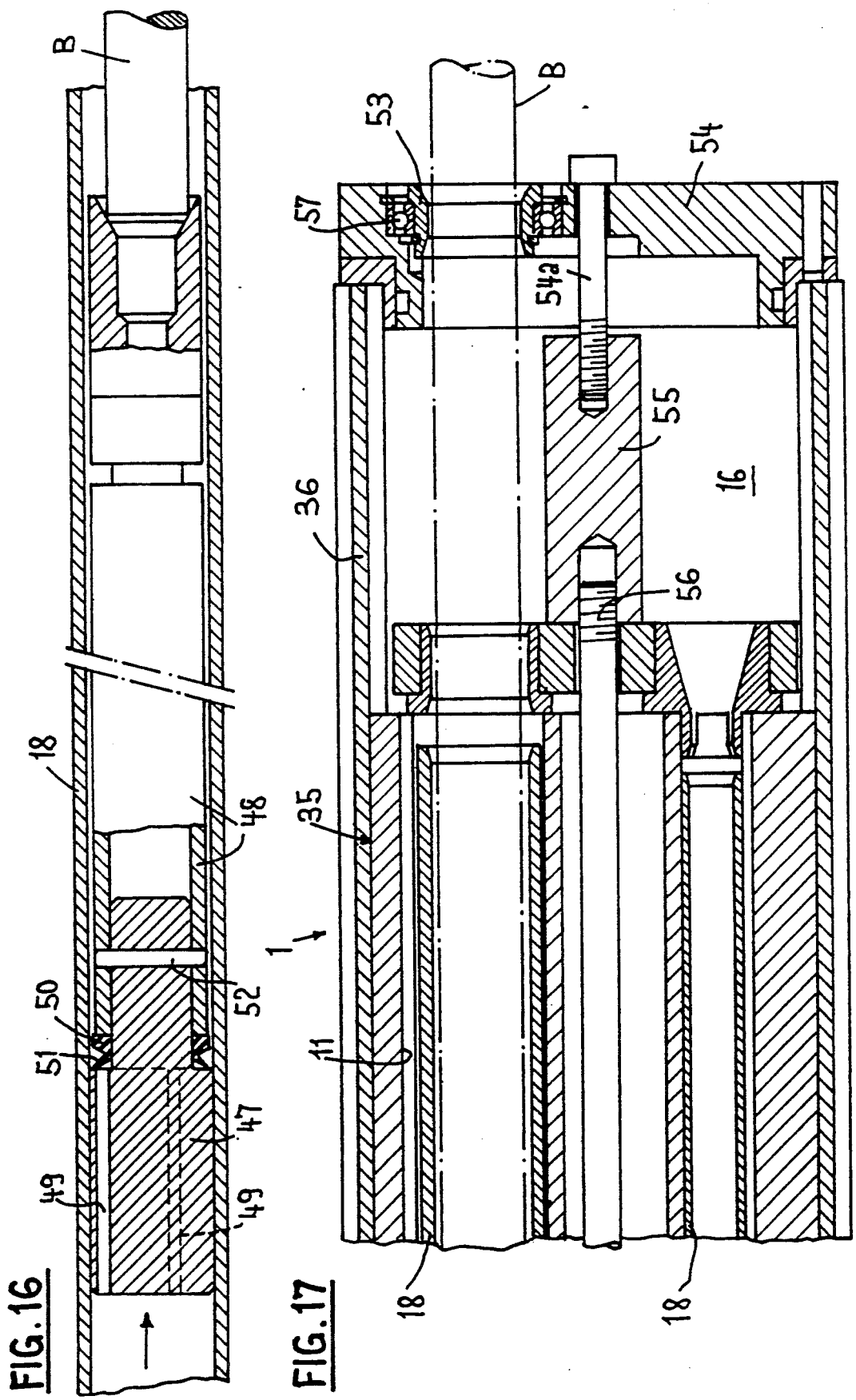

GUIDE-BAR DEVICE FOR AUTOMATIC LATHE AND METHOD OF FABRICATION THEREOF

This is a continuation of application Ser. No. 07/210,029, filed Jun. 22, 1988, U.S. Pat. No. 5,048,383.

BACKGROUND OF THE INVENTION

The present invention relates to a guide-bar device for automatic lathe, comprising a plurality of cylindrical cavities of different diameters provided for receiving and guiding bar stocks of different diameters and or profiles to be machined in the lathe, said cylindrical cavities being provided in a cylindrical body of circular or polygonal cross section having a length at least equal to the length of the bar stocks to be machined, all cylindrical cavities being parallel to the axis of the cylindrical body and at the same distance from said axis.

Such a guide-bar device is known from the patent EP 0 070 073 according to which the cylindrical body is formed by a plurality of longitudinal pieces of central profile and at least of a plurality of pieces of marginal profile assembled around the pieces of central profile, the periphery of each piece of central profile being provided with arcuate longitudinal grooves and the internal surface of each piece of marginal profile being provided with arcuate longitudinal grooves cooperating with the longitudinal grooves of the pieces of central profile for creating cylindrical cavities in the cylindrical body. Such a construction of the guide-bar device is relatively expensive because of the number and the variety of the pieces of central and marginal profile and of the complexity of the assembly of these pieces. Moreover, the cylindrical cavities of the cylindrical body comprise generally protective tubes driven in these cavities and forming then the proper guiding tubes. In this case, the indexing of the cylindrical body is not accurate because of the tolerances of concentricity of the tubes of different diameters provided in this cylindrical body, these tolerances having the effect that the centers of the tubes cannot be arranged exactly at the same distance from the axis of the cylindrical body and by the fact that the construction is made of many juxtaposed pieces which is prejudicial to the precision of indexing. The guiding tubes described above further comprise push-pistons provided for controlling the advance of the bars to be machined towards the headstock of the lathe. In this case, there is provided a radial play between the push-pistons and the internal face of the guiding tube for permitting a certain quantity of oil under pressure to pass from the rear part of the push-piston to the front part thereof, between the bar and the internal face of its guiding tube, in order to create a hydrodynamic bearing supporting the bar in rotation in its guiding tube. However, the passage of the oil through the mentioned radial play gives rise to an undesired loss of pressure.

One knows also from the published application EP 0 214 926 a guide-bar device for a single spindel lathe, comprising a unique guiding element of the bar to be machined. At the time of changing the diameter of the bar to be machined, it is necessary to replace the actual element by another element adapted to the diameter of the new bar which leads to foresee undesirable, removable guiding elements. Moreover, at the time of changing the guiding element, losses of the residual oil in the guiding tube may happen. As in the preceding case, the device comprises a push-piston and a loss of pressure of the oil is also present between the rear part and the front part of the push-piston. This loss is created by the relatively great length of the push-piston and the relatively small radial play between its outer diameter and the internal diameter of the guiding tube.

SUMMARY OF THE INVENTION

It is therefore an object of the present invention to realize a guide-bar device for automatic lathe, of high performance, not expensive to manufacture and not affected by the above mentioned disadvantages of the known devices. Another object of the invention is to indicate a method of fabrication of the guide-bar.

The cylindrical body of the guide-bar device according to the present invention is a shaped piece comprising means appropriate to increase its moment of inertia and consequently its stability, the cylindrical cavities being capable to comprise on their entire length oil distribution channels for dipping the bar to be machined and for creating a hydrodynamic bearing. The cylindrical body is in principle extruded in one single piece having a length at least equal to the length of the bar to be machined. As a variant of the invention, the cylindrical body can be extruded in more than one piece. It can comprise e.g. an extruded core with the cylindrical cavities and reinforcing ribs between the latter and an extruded mantle provided on the central core. Due to the fact that the number of pieces of the cylindrical body is limited to one or two, its manufacturing price is relatively low and the problems mentioned above in relation with the assembly of pieces of central and marginal profiles are eliminated. Because of its particular profile, the cylindrical body has a great moment of inertia which imparts an excellent stability to the device, more particularly with respect to the vibrations produced by the rotation of the bar to be machined in its guiding tube. Moreover, the problem of the lack of precision of the indexing is also eliminated because the precision of the operation of extrusion permits the cylindrical cavities to be arranged practically all at the same distance of the axis of the cylindrical body. The cylindrical cavities can be provided with tubes of different diameters for receiving the bars to be machined, these tubes being arranged with play in the cylindrical cavities in which they rotate freely, these tubes being, as already mentioned, the proper guiding tubes. A hydrodynamic bearing may be created between the internal surface of the cylindrical cavities and the external surface of the tubes and a second hydrodynamic bearing is created between the internal surface of the tube and the surface of the bar to be machined. The oil for these two hydrodynamic bearings can be delivered by longitudinal channels provided at the internal surface of the cylindrical cavities and by radial openings in the tubes, these channels and these openings having a cross section sufficient for avoiding the losses of pressure mentioned of the known devices. The hydrodynamic bearings permit, as mentioned in the document EP 0 214 926, to realize very great speeds of rotation of the bar to be machined. These speeds are only possible because the device is of an excellent stability. The preceding shows that the device according to the present invention is not expensive in production and that it permits high performances of machining.

The invention will be described further by way of examples of execution illustrated in the drawings.

BRIEF DESCRIPTION OF THE DRAWINGS

FIG. 1 is a longitudinal cross section of the device according to the invention along the line I—I of FIG. 2, FIG. 2 is a cross section along the line II—II of FIG. 1, FIG. 3 is a cross section along the line III—III of FIG. 1, FIG. 4 is a longitudinal cross section illustrating the conditions of suction of the push-piston, FIG. 16 shows a preferred embodiment of a push-piston according to the invention, and FIG. 17 shows a steady rest for the device according to the invention.

DETAILED DESCRIPTION OF THE INVENTION

Figure 5:
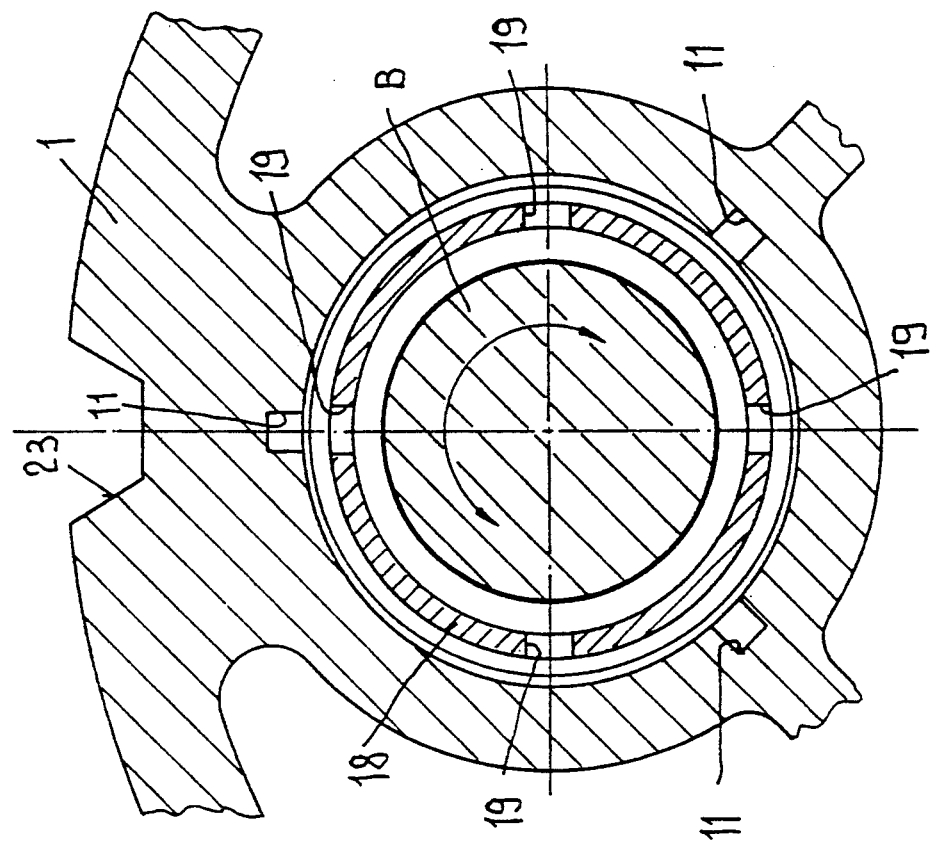
FIGS. 5 and 6 are respectively enlarged views of transversal and longitudinal cross sections showing the channels of the cylindrical cavities and the openings of the tubes.
Figure 6:
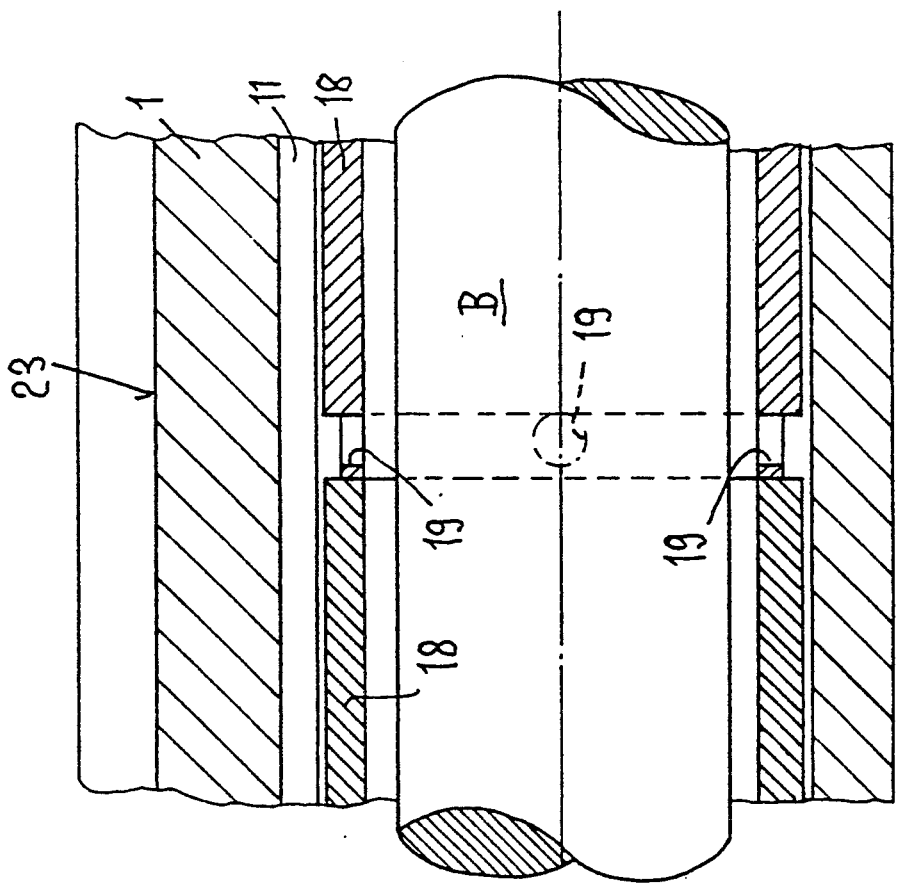

FIG. 1 shows the device according to the invention which consists essentially of a shaped piece or cylindrical body 1 illustrated in cross section in FIG. 2. This cylindrical body has a length at least equal to the one of the bars B to be machined (e.g. 5 m) and it comprises a plurality (four in the example illustrated in FIG. 2) of cylindrical cavities of different diameters 2, 3, 4 and 5 delimiting between themselves cavities of substantially triangular shape 6, 7, 8 and 9. The cylindrical cavities are foreseen for receiving the bars B of different diameters to be machined. The lower triangular cavities 7 and 8 can serve of channels for the recovery of oil flowing out of the cylindrical cavities in front of the device (on the right in FIG. 1). It is to be seen that the cylindrical body is a shaped piece having a great moment of inertia because of its general configuration with internal reinforcing ribs 10 connecting the cylindrical cavities 2-5 between themselves as well as to the external ring or mantle of the cylindrical body 1. This configuration imparts a very great stability to the device. The cylindrical body 1 is normally extruded with the cylindrical and triangular cavities and the mantle in one piece e.g. of aluminum but it is also possible to produce it of synthetic material. As already mentioned, the cylindrical body can also be produced e.g. in two pieces: The internal core with the cavities and the ribs and the mantle. It further comprises oil distribution channels 11, an oil collector 16 and indexing grooves 23, all of these elements being obtained by the same operation of extrusion of the cylindrical body. Moreover it is known that the precision of extruded pieces is high which contributes to suppress any machining operation of the extruded body while guaranteeing that all the cylindrical cavities are disposed in the cylindrical body precisely at the same distance from the axis of the latter. Each cylindrical cavity 2-5 comprises tubes 18 e.g. of steel having a smaller diameter than the internal diameter of the cavities. These tubes 18 serve the purpose of protecting the cylindrical cavities against the damages which would be caused by the contact of the relatively fast rotating bar to be machined with the relatively soft surface of the cylindrical cavities of the extruded cylindrical body of aluminium.

The oil distribution or oil feeding channels 11 (three for each cylindrical cavity in the illustrated example) extend on the whole length of the cylindrical body. The channels of the working cavity, that is the cavity which contains the bar B in course of machining, are in communication at the rear part of the device with an oil distributor 12 (FIG. 3) secured to the barrel or cylindrical body 1 and indexed with the latter. The oil distributor 12 comprises for each cavity a bore 13 connected to a bore 14 of a fixed cylinder 15 not indexed with the cylindrical body 1. The bore 14 is supplied with oil under pressure from a hydraulic group 20 which will be described later on. The oil which escapes at the front part of the working cavity, the cavity located at twelve o'clock in FIG. 2, falls in an oil collector 16 integral with the cylindrical body 1 and it returns to the hydraulic group through the triangular cavities 7 and 8 of the body 1. This supply of oil under pressure is distributed on the one hand at the rear part of a push-piston 17 acting against the rear extremity of the bar to be machined B for causing the advance of the bar towards the headstock of the automatic lathe when the workpiece in course of machining is terminated and on the other hand through the feeding channels 11 towards the front part of the push-piston. The tubes 18 (only one is illustrated in FIG. 2) can rotate freely inside of the cylindrical cavities. The length of each tube 18 is much shorter (e.g. 50 cm) than the length of the cylindrical body so that each cylindrical cavity comprises along its longitudinal axis a plurality of tubes 18 in free contact with each other. These tubes are the proper guiding tubes. They comprise radial openings 19 (FIG. 5) permitting the passage of oil under pressure between the supply channel 11 and the space between the bar B to be machined and the tubes 18 so that a first hydrodynamic bearing is created between the bar and the internal surface of the tubes 18. Oil delivered by the channels 11 between the internal surface of the cylindrical cavities 2-5 and the external surface of the tubes 18 may create if desired a second hydrodynamic bearing, in accordance with the principle described in the published Patent Application EP 0 214 926. The dimensions of the channels 11 and of the openings 19 are determined for preventing any loss of pressure between the inlet of oil at the rear part of the device and the front part of the push-piston, at the location of the hydrodynamic bearings supporting the rotating bar. The relatively short length of the tubes 18 is determined in order to permit the creation of the first hydrodynamic bearing even in the case where the bar B to be machined is of a short length because it is nearly fully exhausted. If each cylindrical cavity would comprise e.g. only one tube 18 having a length equal to the one of the cylindrical body, this tube could practically not be set into rotation by a remnant having a short length of a bar practically fully machined and the first hydrodynamic bearing could not form. The preceding shows that the device has provision for working with two hydrodynamic bearings which permits very great speeds of rotation of the bar to be machined. However, only the first hydrodynamic bearing is necessary. The tubes 18 can be of steel or of synthetic material which contributes to reduce the noise of the device. As already mentioned, these tubes serve also as a protection for the cylindrical cavities. As in the known guide-bar devices of this type, the push-piston 17 is retracted towards the rear part of the device by vacuum or depression for liberating the inlet of the empty guiding tube when a new bar to be machined has to be inserted in this guiding tube by the front part thereof. In the present invention, the hydraulic group 20 comprises a hydraulic change-over valve 21 which permits to pass from the condition of supplying oil under pressure at the rear part of the push-piston to the condition of depression for retracting the push-piston without changing the direction of rotation of the pump 22. The condition of supplying oil under pressure with the corresponding position of the hydraulic valve 21 is illustrated in FIG. 1 and the condition of depression with the corresponding position of the hydraulic valve 21 is illustrated in FIG. 4. As shown in FIG. 1, the valve 21 comprises a rotating core 30 and a fixed body 31 connected to the pump 22 by ways a and b, to an oil tank 32 by a way c and to the cylindrical body 1 by a way d. A comparison of the FIGS. 1 and 2 shows that the cylindrical body can be set under pressure or under depression according to the angular position of the rotating core 30. Moreover, according to FIG. 1, the oil coming from the tank 32 enters in the valve 21 by the way c, arrives to the pump 22 by the way b, is send back under pressure to the valve 21 by the way a and is delivered to the cylindrical body by the way d. In the valve 21, and for the position of the core 30 illustrated in FIG. 1, the oil passes from the way c to the way b and from the way a to the way d. It is visible that the angular display cement of the rotating core 30 permits also to adjust the quantity of oil delivered by the way d to the cylindrical cavity 2 in the working condition.

Figure 7:
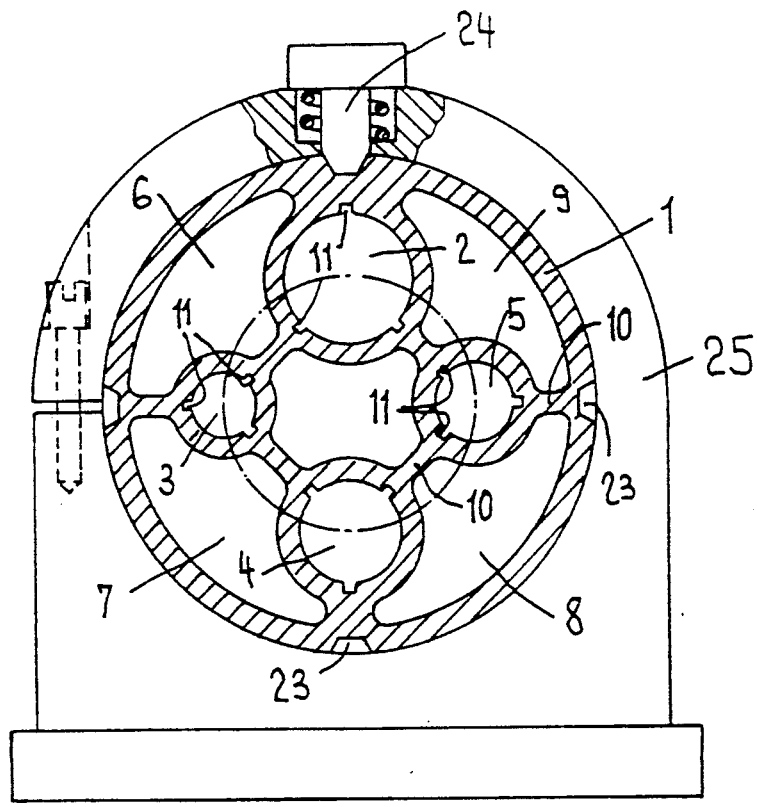
FIG. 7 shows the finger for the indexing of the cylindrical body.

FIG. 7 shows that the extruded cylindrical body 1 comprises indexing grooves 23 in which an indexing finger 24, normally located in the front part of the device, is inserted, e.g. under the pressure of a spring, in the indexing position corresponding to the working tube 2. As already mentioned, the precision of extruded pieces is relatively great so that the position of the grooves 23 is defined with precision. FIG. 7 shows also a fixing element 25 supporting the cylindrical body 1.

Figure 8:
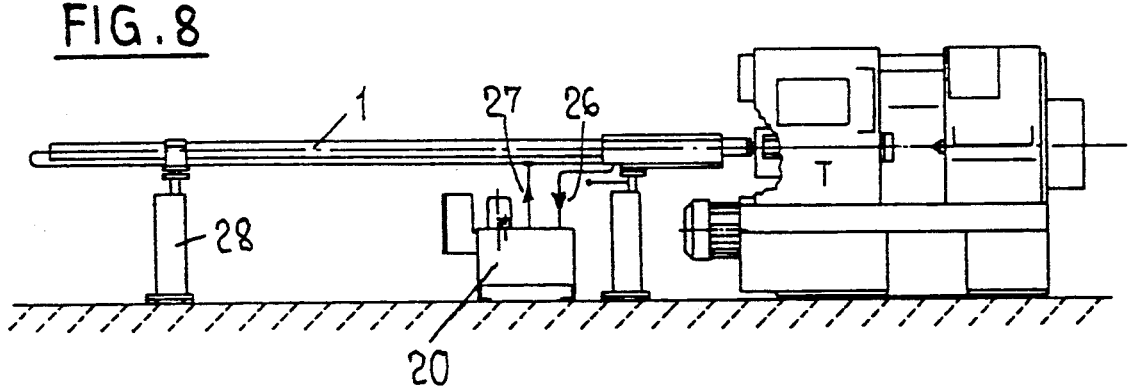
FIG. 8 is a lateral view of the device with the hydraulic group.

FIG. 8 is a lateral view of the guide-bar device in working position, located at the rear part of a single spindel automatic lathe T. One recognize the hydraulic group 20 with the supply of oil 27 and the return of oil 26.

Figure 9:
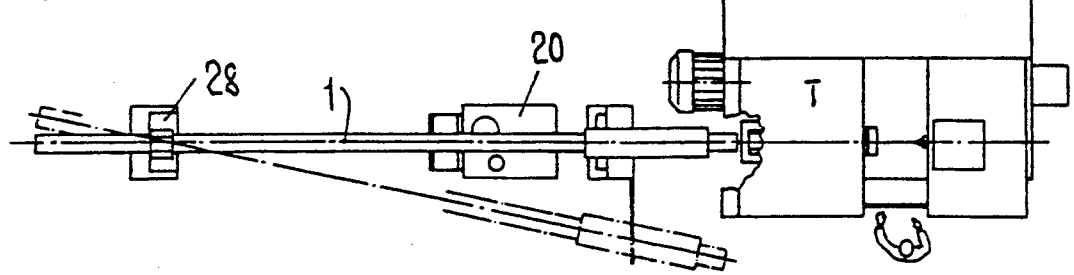
FIG. 9 is a plain view showing the device in condition for receiving a new bar to be machined.

FIG. 9 is a plain view of the device in the position foreseen for inserting a new bar to be machined in the cylindrical body. In this case the push-piston has been retracted by suction towards the rear part of the device and the cylindrical body 1 has been displaced of a certain angle about the axis of the rear supporting post 28 in order to liberate the front part of the cylindrical body and to permit the insertion of the new bar to be machined in the corresponding cylindrical cavity of the cylindrical body from the front part thereof. One sees that this operation of inserting a new bar stock does not require any removal of a piece from the device so that this operation is easy and rapid.

Different variants of execution are possible. For example, it has been experienced that the operation extrusion of the cylindrical body in one piece is preferably reserved for the elements of relatively small diameter. For elements of greater diameters, the extrusion of the cylindrical body can be simplified if the latter is made in two pieces.

Figure 10:
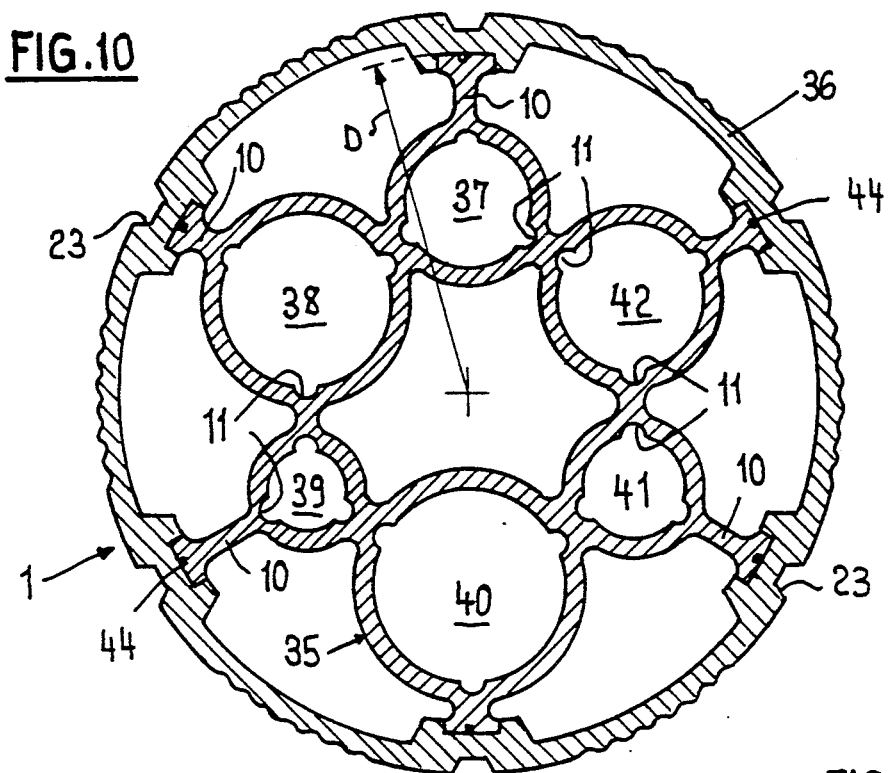
FIG. 10 shows a variant of execution of a guiding tube in two parts.
Figure 11:
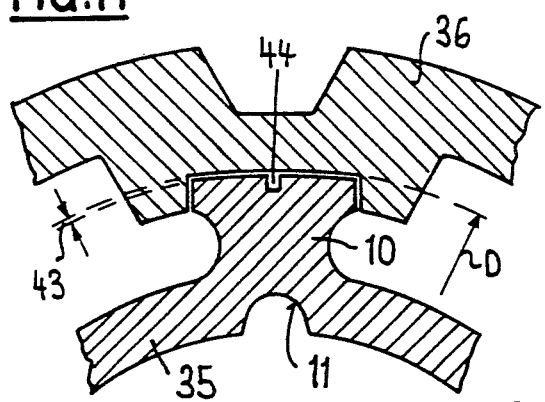
FIG. 11 shows one of the places of contact between the two parts not yet assembled together of the guiding tube of FIG. 10.
Figure 12:
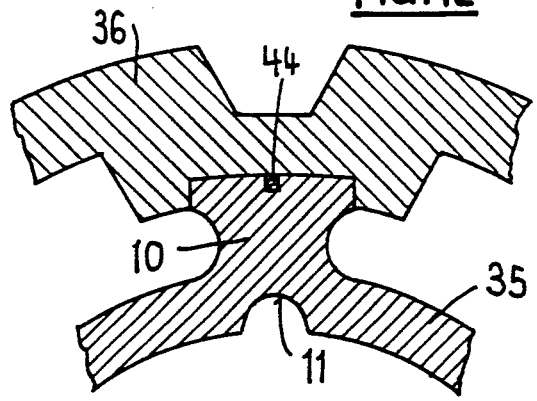
FIG. 12 shows the two parts of the guiding tube of FIG. 10 after they have been assembled together.

FIG. 10 shows a cylindrical body extruded in two pieces. It comprises a core 35 and a mantle 36. It is to be seen that the core is a shaped piece comprising the cylindrical cavities 37–42, each cavity being connected with ribs 10 to the mantle 36 of generally cylindrical shape. As previously mentioned, the core 35 and the mantle 36 are both at least of the length of the bar to be machined. In order to ensure a good fastening of the mantle to the core, one proceeds as follows. The internal diameter D of the mantle at the places of contact with the external extremity of the ribs 10 of the core is extruded in such a way as to present a play 43 (FIG. 11) sufficiently great for permitting the mantle to be slipped easily on the core, on the whole length of the latter. The mantle is then submitted to a tractive force exerted on its two extremities. This force is great enough for causing an elongation of the mantle which results in a reduction of its diameter so that the mantle comes in good contact against the extremities of the ribs 10. FIG. 11 shows the play 43 between the mantle 36 and the core 35 before the operation of elongation of the mantle by the tractive force. FIG. 12 shows the result of the elongation of the mantle: the play 43 has disappear. It is further to be seen from FIGS. 11 and 12 that the external extremity of the ribs 10 are each provided with a groove 44. At the time of the assembly of the mantle on the core as indicated above, this groove is filled with an adequate sort of glue which in the elongated condition of the mantle (FIG. 12), ensures a good adhesion of the mantle on the core.

Figure 13:
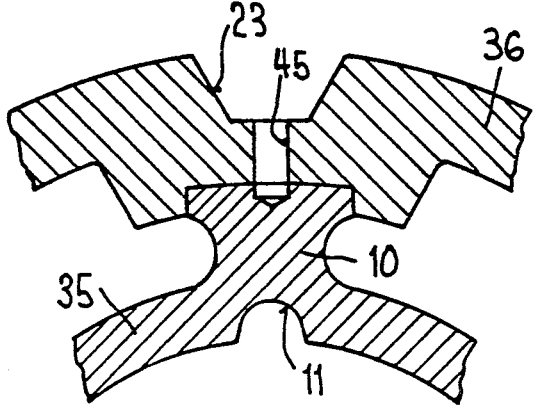
FIG. 13 shows a second mode of assembling together the two parts of the guiding tube of FIG. 10.

FIG. 13 shows a variant of the fastening of the mantle on the core. In this case, after the mantle has been elongated, holes 45 are drilled along the mantle at distances of e.g. 50 cm from each other, in the indexing grooves 23 and in the external extremity of the ribs 10, on the whole length of the cylindrical body 1. At each hole the mantle is then secured to the core by neutral gas welding. This ensures a good mutual adhesion of both parts of the cylindrical body.

Figure 14:
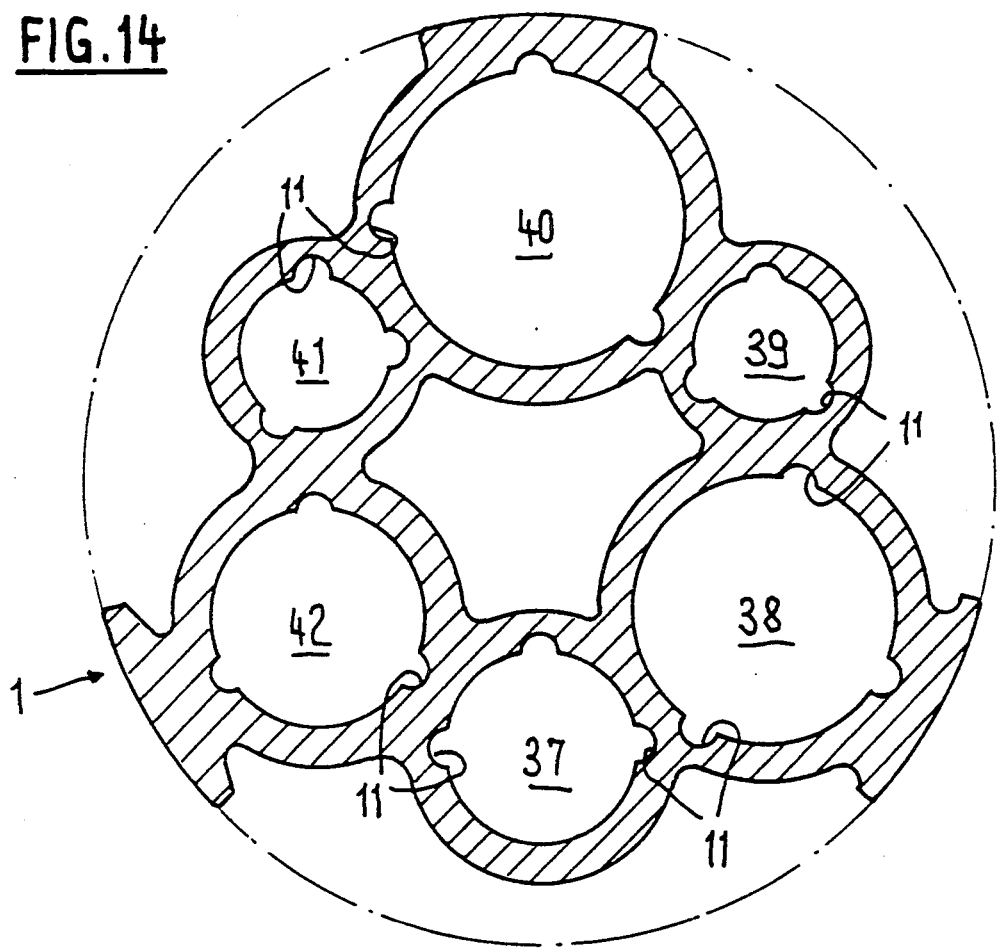
FIG. 14 shows a third form of execution of the guiding tube according to the invention.
Figure 15:
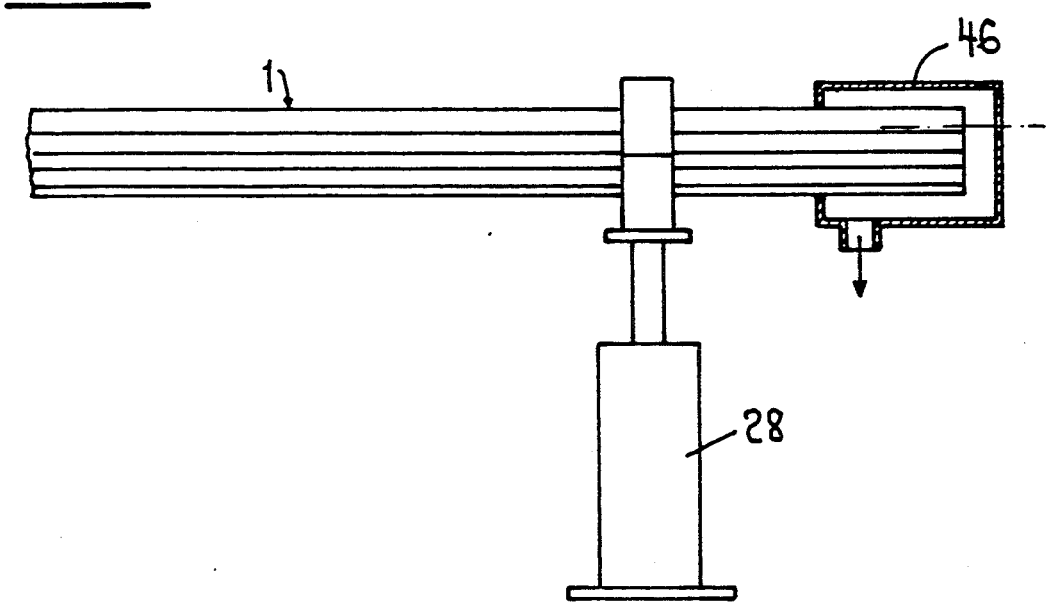
FIG. 15 shows a cover provided at the front end of the guiding tube of FIG. 14.

FIG. 14 shows a further variant of the cylindrical body according to the invention. It is to be seen that the cylindrical body of FIG. 14 consists of a single shaped piece. The configuration is such that it permits to extrude such pieces for cylindrical bodies of relatively great diameters without too much difficulties in production. However, in this case it is no longer possible to provide an oil collector integral with the cylindrical body like in the other executions because the cylindrical body of FIG. 14 has no mantle. FIG. 15 shows that a cap or cover 46, e.g. of sheet iron, is provided on the cylindrical body of FIG. 14 at the front side thereof. The oil collector 46 has exactly the same functions then the oil collector 16 of FIG. 1.

FIG. 16 shows a particularly interesting embodiment of a push-piston 47,48. The piston 47 of cylindrical shape comprises e.g. three oil channels 49 and it receives oil under pressure at its reart part as indicated by the arrow. The function of the oil channels is to feed the front part of the pusher 48 and thus the bar B to be machined with oil under pressure for forming a hydrodynamic bearing between the internal face of the tubes 18 and the external face of the bar B. The piston is assembled to the pusher by a pin 52. FIG. 16 shows that the piston comprises a resilient joint ring 50. The function of this joint ring is the following. When oil enters the channels 49, the pressure draws aside the tongue 51 (towards the right hand side in FIG. 16) so that oil flows from behind the piston 47 through the channels 49 between the internal face of the tubes 18 and the external face of the pusher 48 to the space between the tubes 18 and the bar B to be machined for forming the said hydrodynamic bearing. At the time when the piston must be retracted by vacuum or depression (to the left hand side in FIG. 16) for permitting the introduction in the guiding tube of a new bar B to be machined, the joint 50 closes by its tongue 51, which comes to press against the border of the channels 49, the passage between the right side of the channels 49 and the space between the tubes 18 and the pusher 48, thus hindering the oil in front of the piston to be drawn by suction to the rear part of the piston or the device. Further, the push-piston of FIG. 16 has the advantage of being of a very simple design and the channels 49 can have a section sufficient for preventing any undesired loss of pressure of the oil fed in front of the pusher.

As shown in FIG. 17, the guide-bar device according to the invention may comprise a steady rest 53 secured in a cap or cover 54 on the front part of the device. The cover 54 is secured itself to the device by means of the elements 54a, 55 and 56. The purpose of the steady rest which comprises a ball bearing 57 is to support the bar B to be machined between the front part of the guide-bar device and the inlet of the head stock of the lathe. The bar B has a small play in the steady rest for permitting its axial motion and its rotation when driven by the lathe.

The advantages of the above described device are the following. At first, the device can be produced advantageously because it consists of few pieces, the cylindrical body being fabricated in one or two pieces, this shaped piece not necessitating any further machining due to the high precision of the operation of extrusion. The assembly time is strongly reduced in comparison with the executions of the devices known from the prior art. Secondly, the device is capable of very high performances because it can be provided with a double hydrodynamic bearing, the lateral supply of oil for the creation of the hydrodynamic bearings taking place on the whole length of the cylindrical body. Moreover, the cylindrical body is aligned very precisely with the headstock of the lathe by the fact that its configuration and its original diameter are of great precision due to extrusion, in that the indexing is realized without any intermediate spacer like pieces, the grooves 23 being integral with the shaped piece and by the fact that the extruded shaped piece, e.g. of aluminium is very stable because of its particular configuration. Thirdly, the device according to the present invention is particularly easy to utilize. It is practically noiseless because of the double hydrodynamic bearing, more particularly when the tubes 18 are of synthetic material, the oil circulates in a close circuit so that there is no risk that it becomes contaminated from the outside. The oil collector is integral with the shaped piece (not in the embodiment of FIGS. 14,15) as well as the distribution of oil. The time for changing the cylindrical cavity is extremely short because of the indexing of the cylindrical body. In case of changing of the diameter of the cavity, one acts exclusively in the region of the front part of the device and no piece has to be removed. It is further to be noted that in the present invention, the push-piston can be of any possible execution and that it is not necessary that the distribution of oil to the bar to be machined be realized through the push-piston as indicated in the prior art mentioned in the introduction of the description.

I claim:

1. Guide-bar device for an automatic lathe, comprising a plurality of tubular cavities of different diameters provided for receiving and guiding bars to be machined of different diameters and or profiles, said tubular cavities being arranged in a cylindrical body of circular or polygonal cross section with a longitudinal axis, having a length at least equal to the length of the bars to be machined, the axis of all of the tubular cavities being parallel to said longitudinal axis of the cylindrical body and at the same distance from said longitudinal axis, said cylindrical body includes means for enhancing its moment of inertia and consequently its stability, said tubular cavities including on their whole length oil distribution channels for dipping said bars to be machined.

2. Guide-bar device for receiving and guiding bar stocks of different diameters and/or profiles to be machined in an automatic lathe, comprising:
 a cylindrical body having a length at least equal to the length of the bars to be machined with a longitudinal axis running the length thereof;
 a plurality of tubular members forming tubular cavities of different diameters for receiving and guiding the bars to be machined, said tubular cavities being arranged in said cylindrical body parallel to the longitudinal axis of said cylindrical body, and said tubular cavities being capable of comprising on their whole length oil distribution channels for dipping said bars to be machined;
 said cylindrical body including a peripheral ring connected by reinforcing ribs to each of said tubular members, each of said tubular members being further connected by reinforcing ribs to adjacent tubular members, said reinforcing ribs enhancing the moment of inertia and hence the rigidity and the stability of said cylindrical body; and
 said cylindrical body also including a plurality of cavities of substantially triangular shape formed by said peripheral ring and each pair of adjacent tubular members connected by said reinforcing ribs, and said plurality of cavities being capable of comprising on their whole length oil return channels.

3. Device according to claim 2, characterized in that each of said reinforcing ribs has a width less than the diameter of said tubular cavities of said tubular members.

4. Guide-bar device for receiving and guiding bar stocks of different diameters and/or profiles to be machined in an automobile lathe, comprising:
 a cylindrical body having a length at least equal to the length of the bars to be machined with a longitudinal axis running the length thereof;
 a plurality of tubular members forming tubular cavities of different diameters for receiving and guiding the bars to be machined, said tubular cavities being arranged in said cylindrical body parallel to the longitudinal axis of said cylindrical body, and said tubular cavities being capable of comprising on their whole length oil distribution channels for dipping said bars to be machined;

said cylindrical body including a peripheral ring connected by reinforcing ribs to each of said tubular members, each of said tubular members being further connected by reinforcing ribs to adjacent tubular members, said reinforcing ribs enhancing the moment of inertia and hence the rigidity and the stability of said cylindrical body; and oil distributing means for distributing oil being located at a rear part of said cylindrical body, an oil collector located at a front part of said cylindrical body and means permitting a return of the oil to a hydraulic group feeding said device with the oil under pressure in a closed circuit.

5. Device according to claim 4, characterized in that said means which permit said return of oil is adapted to include a plurality of cavities of substantially triangular shape formed in said cylindrical body by said peripheral ring and each pair of adjacent tubular members connected by said reinforcing ribs.

6. Guide-bar device for receiving and guiding bar stocks of different diameters and/or profiles to be machined in an automatic lathe, comprising:

a cylindrical body having a length at least equal to the length of the bars to be machined with a longitudinal axis running the length thereof;

a plurality of tubular members forming tubular cavities of different diameters for receiving and guiding the bars to be machined, said tubular cavities being arranged in said cylindrical body parallel to the longitudinal axis of said cylindrical body, and said tubular cavities being capable of comprising on their whole length oil distribution channels for dipping said bars to be machined;

said cylindrical body including a plurality of reinforcing ribs connecting each of said tubular members to adjacent tubular members, said reinforcing ribs enhancing the moment of inertia and hence the rigidity and the stability of said cylindrical body;

said cylindrical body including means for angularly positioning which permit in cooperation with fixed external means a precise indexing of said cylindrical body; and oil distributing means for distributing oil including a cap being located at a rear part of the cylindrical body, an oil collector located at a front part of the cylindrical body and means permitting a return of an oil to a hydraulic group feeding said device with said oil under pressure in a closed circuit.

7. Device according to claim 6, characterized in that said hydraulic group is provided with a hydraulic change-over valve which permits delivery of oil under pressure to the cylindrical body or to set said cylindrical body or to set said cylindrical body under depression without changing the direction of rotation of an oil pump of said hydraulic group.

8. Device according to claim 7, characterized in that the hydraulic change-over valve comprises a distributing block provided with a rotating core permitting to feed the tubular cavity in service with oil under pressure or to produce a depression in said tubular cavity and to adjust by its angular position the oil flow to said tubular cavity.

9. Device according to claim 8, characterized by a steady rest provided at the front part of said cylindrical body for supporting the bar to be machined between said device and the head stock of the lathe.

10. Device according to claim 6, characterized in that a cover is provided at the front part of the cylindrical body for closing said cylindrical body, said cover having the function of an oil collector.

* * * * *